United States Patent
Libby

(10) Patent No.: US 12,145,833 B1
(45) Date of Patent: Nov. 19, 2024

(54) BEVERAGE SYSTEM

(71) Applicant: Table Tap, L.L.C., Roswell, GA (US)

(72) Inventor: Jeffrey Isaac Libby, Roswell, GA (US)

(73) Assignee: Table Tap, L.L.C., Roswell, GA (US)

( * ) Notice: Subject to any disclaimer, the term of this patent is extended or adjusted under 35 U.S.C. 154(b) by 0 days.

(21) Appl. No.: 18/341,537

(22) Filed: Jun. 26, 2023

Related U.S. Application Data

(63) Continuation of application No. 16/246,276, filed on Jan. 11, 2019, now abandoned.

(51) Int. Cl.
| | | |
|---|---|---|
| B67D 3/00 | (2006.01) | |
| B67D 1/00 | (2006.01) | |
| B67D 7/22 | (2010.01) | |
| G05D 7/06 | (2006.01) | |
| G06F 9/30 | (2018.01) | |
| G07C 3/08 | (2006.01) | |
| G07F 9/00 | (2006.01) | |
| G07F 9/02 | (2006.01) | |
| G07F 15/00 | (2006.01) | |

(52) U.S. Cl.
CPC ......... *B67D 3/0077* (2013.01); *B67D 1/0085* (2013.01); *B67D 7/221* (2013.01); *G05D 7/0617* (2013.01); *G06F 9/30003* (2013.01); *G07C 3/08* (2013.01); *G07F 9/002* (2020.05); *G07F 9/02* (2013.01); *G07F 15/00* (2013.01)

(58) Field of Classification Search
CPC .......... G07F 9/026; G07F 9/002; G07F 9/001; B67D 2001/08222; B67D 7/34; G06Q 20/18; G07C 3/08; G05D 7/0617
USPC .................................................. 700/233–244
See application file for complete search history.

(56) References Cited

U.S. PATENT DOCUMENTS

| | | |
|---|---|---|
| 4,979,641 A | 12/1990 | Turner |
| 10,726,246 B1 | 7/2020 | McClellan |
| 11,820,641 B2 * | 11/2023 | Alpmen ............... B67D 1/0888 |
| 2014/0110018 A1 | 4/2014 | Scarvelli |
| 2015/0032555 A1 * | 1/2015 | Jones ..................... B67D 7/221 |
| | | 705/15 |
| 2015/0170130 A1 * | 6/2015 | Patel .................... G06Q 20/405 |
| | | 705/17 |
| 2015/0329346 A1 | 11/2015 | Miller |
| 2015/0368086 A1 | 12/2015 | Sacchetti |
| 2016/0155127 A1 | 6/2016 | Hartman |
| 2017/0043995 A1 | 2/2017 | Reichelt |
| 2017/0088410 A1 * | 3/2017 | Wing .................. B67D 1/0036 |

(Continued)

*Primary Examiner* — Timothy R Waggoner
(74) *Attorney, Agent, or Firm* — Fish & Richardson P.C.

(57) ABSTRACT

Methods, systems, and apparatus, including computer programs encoded on a computer storage medium, for beverage dispensing. In one aspect, a client device requests activation of a beverage system at the given location. An authorization request is transmitted to a control terminal of a given location that includes a client identifier and requests confirmation that a user of the client device meets minimum age requirements for dispensing beverages provided by the beverage system. The confirmation is received that the user of the client device is approved to use the beverage system, and the beverage system is activated for use by the user of the client device, and a command is transmitted that is required to open a valve of the beverage system located between a beverage source and a beverage dispenser that controls beverage flow when the valve is open.

19 Claims, 6 Drawing Sheets

(56) References Cited

U.S. PATENT DOCUMENTS

| | | |
|---|---|---|
| 2017/0174496 A1* | 6/2017 | Gold ................. G06F 3/041 |
| 2018/0029859 A1 | 2/2018 | Hevia |
| 2018/0288594 A1 | 10/2018 | Kim |
| 2020/0051148 A1 | 2/2020 | Green |
| 2020/0095111 A1 | 3/2020 | Lorkowski |
| 2021/0188612 A1 | 6/2021 | Radcliffe |

* cited by examiner

BEVERAGE SYSTEM

CROSS-REFERENCE TO RELATED APPLICATIONS

This application is a continuation application of, and claims priority to, U.S. patent application Ser. No. 16/246,276, filed on Jan. 11, 2019. The disclosure of the foregoing application is incorporated herein by reference in its entirety for all purposes.

BACKGROUND

This specification relates to beverage dispensing technology.

Many businesses, such as restaurants, bars, and other businesses (e.g., sports venues and concert venues) dispense beer and other alcoholic and non-alcoholic beverages to customers. Businesses generally require staff, such as bartenders or wait staff, to dispense beverages to customers, which results in customers having to wait upon bar staff to serve them beverages. For example, a customer may come in to a busy bar and order a beverage, but will not be able to enjoy the beverage until the bar staff attends to the order. The customer may have to wait for a long period of time after ordering before they are able to receive their beverage, or if the bar staff is particularly busy, the customer may have to wait for a long period of time before even being able to order their beverage.

SUMMARY

In general, one innovative aspect of the subject matter described in this specification can be embodied in methods that include the actions of receiving an approval request that requests approval for a user to dispense a beverage from a beverage system at a given location; transmitting an authorization request that includes a client identifier corresponding to the approval request, and requests confirmation that a user of the client device is approved to use the beverage system at the given location based on validation that the user of the client device meets minimum requirements for dispensing beverages provided by the beverage system; receiving the confirmation that the user of the client device is approved to use the beverage system; and activating the beverage system for use by a user of the client device, including transmitting, to the beverage system, a command that is required to open a valve of the beverage system located between a beverage source and a beverage dispenser that controls beverage flow when the valve is open.

These and other embodiments can each optionally include one or more of the following features. Methods can further include the actions of receiving an indication that the client device is present at a particular beverage dispenser of the beverage dispenser, wherein transmitting the command to the beverage system comprises transmitting a given command that (i) opens a particular valve of the particular beverage dispenser in response to receiving the indication that the client device is present at the particular dispenser (ii) does not affect a state of other valves in the beverage system.

Activating the beverage system can include activating the beverage system for a limited period that ends when a specified amount of beverage has been dispensed. Methods can further include the actions of transmitting a message that the limited period ended when the specified amount of beverage has been dispensed and transmitting a renewed authorization request.

Methods can further include the actions of determining a current state of the user; comparing the current state of the user to a baseline state for the user; and providing a state message to the control terminal when the current state of the user deviates from the baseline state by at least a specified amount.

Methods can further include the actions of receiving user preferences of the user; and transmitting digital content selected using the user preferences to at least one of the client device or the beverage system.

Methods can further include the actions of presenting beverage source information specifying one or more of a remaining amount of a beverage in the beverage source, a description of the beverage, or user notes about the beverage submitted by one or more other users.

Methods can further include the actions of receiving beverage source information from the given location, the beverage source information specifying a type of beverage being supplied by the beverage source; transmitting an availability notification for the type of beverage at the given location; receiving a request to reserve a specified amount of the type of beverage for the user at the given location; transmitting a reservation message that reserves the specified amount of the type of beverage for the user at the given location; receiving a reserve confirmation from the control terminal of the given location reserving the specified amount of the beverage at the given location; and transmitting a notification of the reserve confirmation to the client device.

Activating the beverage system can be conditioned on a biometric confirmation of the user at the given location or a digital confirmation can further include the actions of receiving a pour request indicating that the user is ready to dispense a beverage from the beverage system, the pour request including one or more of the biometric confirmation indicating that the user has provided biometric information that matches stored biometric information for the user or the digital confirmation indicating that the user has met a digital challenge requirement, wherein activating the beverage system comprises activating the beverage system based on the one or more of the biometric confirmation or the digital confirmation included in the pour request. Other embodiments of this aspect include corresponding systems, apparatus, and computer programs, configured to perform the actions of the methods, encoded on computer storage devices.

Another innovative aspect of the subject matter described in this specification can be embodied in a system that includes a beverage access controller, including one or more data processing apparatus and one or more memory devices, wherein the beverage access controller is configured to interact with a client device of a user and a beverage system at the given location, and wherein the beverage access controller is configured to execute instructions that cause the beverage access controller to control a valve of the beverage system to perform the actions of the methods.

The system can further include a smart tap that communicates with the beverage access controller over a network. The smart tap can include a handle, a flow meter, one or more valves, a network communication device, and a smart tap identifier that uniquely identifies the smart tap. The handle can include an internal power source that powers the smart tap. The identifier can be specified in one or more of an RFID tag, a QR code, a barcode, NFC, or a Bluetooth transmitter. The smart tap can include one or more of a light source, an audio player, or a visual display. The one or more valves can be one or more of pin valves or solenoid valves.

Execution of the instructions can cause the beverage access controller to perform operations of receiving an indication that the client device is present at a particular beverage dispenser of the beverage dispenser, wherein transmitting the command to the beverage system comprises transmitting a given command that (i) opens a particular valve of the particular beverage dispenser in response to receiving the indication that the client device is present at the particular dispenser (ii) does not affect a state of other valves in the beverage system.

The system can further include presenting beverage source information specifying one or more of a remaining amount of a beverage in the beverage source, a description of the beverage, or user notes about the beverage submitted by one or more other users.

The system can further include receiving beverage source information from the given location, the beverage source information specifying a type of beverage being supplied by the beverage source; transmitting an availability notification for the type of beverage at the given location; receiving a request to reserve a specified amount of the type of beverage for the user at the given location; transmitting a reservation message that reserves the specified amount of the type of beverage for the user at the given location; receiving a reserve confirmation from the control terminal of the given location reserving the specified amount of the beverage at the given location; and transmitting a notification of the reserve confirmation to the client device.

Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. Beverage dispensing can be controlled and monitored remotely using client devices that are connected to a distributed network. Improvements over conventional beverage systems include the ability for the improved beverage systems to enable self-service beverage dispensing, while ensuring that dispensing requirements (e.g., laws) are met. The techniques discussed throughout this document enable a beverage system to identify a user that is requesting beverages to be dispensed and ensures that the user is authorized to dispense the beverages requested. A physical valve located in the beverage system can be actuated (or otherwise physically adjusted) based on commands that confirm the user is authorized to dispense the requested beverages. Sensors, such as RFID sensors, biometric sensors, or other sensors can be used to facilitate identification of the user and to ensure that the user is authorized to dispense beverages.

A user can enjoy a more frictionless experience by buying and self-pouring beverages per ounce, tracking their dispense history, and enjoying expedited service. The user can enjoy ice-cold beer on demand and does not have to calculate gratuity. The user can get beverage information on their device, and can utilize social integration. When a user can self-pour, a business owner can decrease transaction time which results in reduced labor costs and waste. A business owner can see increased consumption when the user can self-pour, leading to increased revenue. The smart tap system can also perform inventory management by monitoring beverage data, and can aid in marketing and promotions. For example, a bar can market and promote the user's ability to self-pour and or provide other messages (e.g., news, advertisements, offers, promotions, loyalty awards, etc.). Furthermore, the amount of lost beverage (e.g., beverages not paid for due to spillage, theft, etc.) can be reduced when the user is billed for the amount dispensed from the beverage system (e.g., the tap).

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
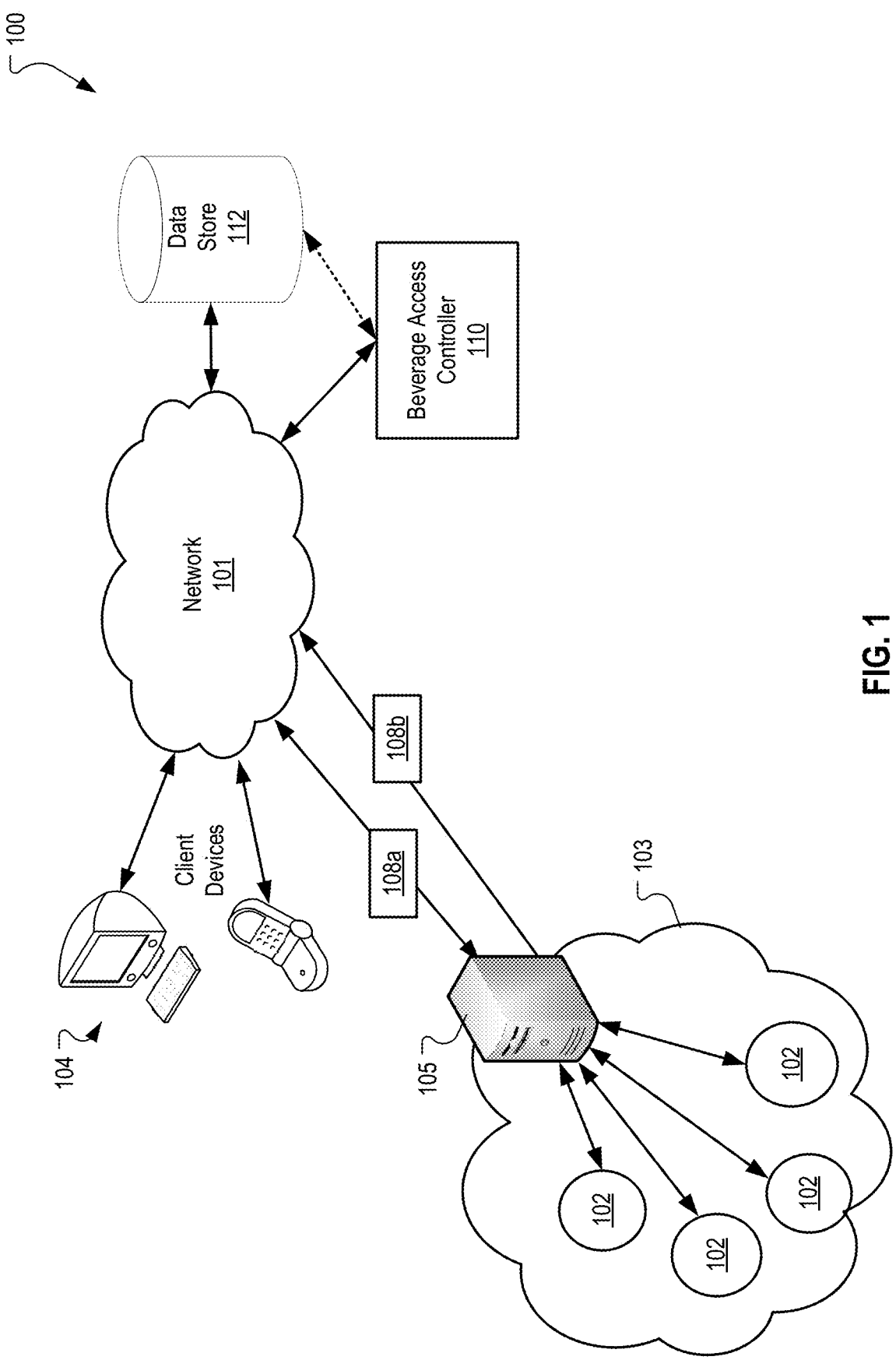
FIG. 1 is an example environment in which beverage dispensing can be controlled.

This document discusses beverage dispensing, and techniques for managing/controlling the dispensing of beverages by various users. Beverage dispensing can be controlled and monitored over a distributed network (e.g., the Internet). As discussed in more detail below, beverage dispensing can be activated/de-activated (i.e., enabled/disabled) in response to receiving activation/de-activation data from, for example, a cloud based computing system (or another computing system).

Activation of the beverage dispensing apparatus causes a valve that controls flow of fluid to a beverage dispenser (e.g., a beer tap) to be opened, while de-activation of the beverage dispensing apparatus prevents further dispensing of a beverage and/or causes the valve to be closed. The phrases activation data and de-activation data refer to data that respectively request and/or cause activation and de-activation of the beverage dispensing apparatus. In some implementations, beverage dispensing is only activated when the activation data are associated with a user identifier (e.g., an assigned identifier such as a username, a biometric confirmation, digital confirmation, or other unique identifier) for a user that is authorized/enabled to activate the beverage dispensing apparatus. In some implementations, activation data are only valid during a specified valid period, such that the beverage dispensing apparatus can only be activated during the valid period (e.g., operating hours of a restaurant, during a scheduled event, or another specified period). In some implementations, activation data are valid irrespective of the time at which the activation data are received.

Once the beverage dispensing apparatus has been activated, the flow of fluid through the beverage dispensing apparatus can be measured, for example, by a flow meter. In turn, reporting data (i.e., data that specifies the amount of fluid that has been dispensed by the beverage dispensing apparatus) can be provided to a client device (e.g., a computer, mobile communications device, or another client device), for example, by e-mail, text message, or another manner of communicating information. Additionally, diagnostic data (i.e., data specifying system diagnostics for a system in which the beverage dispensing apparatus is implemented) can be provided to a client device. For example, the diagnostic data that is provided can specify an operating condition for the flow meter that is measuring the flow of fluid, a temperature of the fluid, a pressure of the fluid, and other diagnostic information.

The beverage dispensing apparatus can be de-activated in response to expiration of the valid period, receiving de-activation or de-authorization data, and/or determining that a threshold amount of fluid has been dispensed. De-activation of the beverage dispensing apparatus causes the valve that controls the flow of fluid to the beverage dispenser to be closed. Once the beverage dispensing apparatus has been de-activated, it can remain de-activated until new instances of the authorization and/or activation data are received.

Control and monitoring of beverage dispensing is described below with reference to controlling and monitoring dispensing of beer. The systems, apparatus, and methods described below can be implemented to dispense other beverages and/or other fluids. The systems, apparatus, and methods described below can also be implemented to control the flow of other materials (e.g., gases) through other distribution systems. Additionally, a beverage system is described as a distributed system that communicates over a distributed network, but the beverage system can be implemented in a local area network or with elements of the system being directly coupled together. In some situations, the various components discussed throughout this document can all be at a single location (e.g., a merchant facility) at which beverages are dispensed. In some situations, some components may be remotely located from each other.

FIG. 1 is an example environment 100 in which beverage dispensing can be controlled. The example environment 100 includes a network 101, such as a local area network (LAN), a wide area network (WAN), the Internet, or a combination thereof. The network 101 connects one or more beverage systems 102 at a given location (e.g., a merchant's physical business location), client devices 104, and a beverage access controller 110. The example environment 100 can have any number of beverage systems 102 at many different locations and any number of client devices 104.

The beverage systems 102 at the given location are beverage dispensing apparatus that control beverage dispensing. In some implementations, the beverage dispensing apparatus are beer taps that dispense beer. An example beer tap, referred to as a smart tap, is described with reference to FIG. 6.

Each beverage system 102 at the given location can be a beverage dispensing apparatus that includes one or more beverage dispensers (e.g., beer taps), one or more valves to control the flow of fluid (e.g., beer) to the beverage dispensers, one or more beverage access controllers that actuate the valves, as well as input/output interfaces (e.g., RFID interfaces, cameras, biometric readers, near field communications (NFC), or other interfaces). Each beverage system 102 at the given location can also include a data processing apparatus (e.g., microprocessors or a controller) that sends and receives data through a localized network 103 (e.g., a local area network).

In some implementations, the beverage systems 102 at the given location are configured to send and receive data directly through the network 101. In some implementations, the beverage systems 102 at the given location send and receive data through access points (e.g., a wireless access point or hardwire network connection) or a control terminal 105 at the given location. The control terminal 105 can be a computer, mobile device, tablet, or any other device that can communicate with the beverage access controller 110 and/or the beverage systems 102 at the given location. Note that the beverage systems 102 at the given location are depicted as connected to the control terminal 105, but that the beverage systems 102 at the given location need not be connected to, or even in communication with, the control terminal 105.

The description that follows describes particular components perform particular functions. However, it should be appreciated that the functions describe herein can be performed by other components, and that devices and systems depicted and/or described in this document can have different configurations than those shown.

The data 108a that are received by the beverage systems 102 at the given location can include configuration data specifying beverage dispensing rules for a location at which the beverage systems are installed. The beverage dispensing rules can include rules that ensure compliance with applicable dispensing laws and regulations. For example, the dispensing rules can specify a threshold (e.g., a maximum) amount of beer that can be dispensed to an individual over a specified period of time (e.g., 20 minutes, one hour, or one day). The dispensing rules can also specify location/event specific dispensing guidelines. For example, as described in more detail below, the dispensing rules can also specify beverage dispensing guidelines for dispensing beverages during events such as sporting events, concerts, and other events. Using the received data, the data processing apparatus of a beverage access controller 110 can control beverage dispensing according to the dispensing rules, as described below. Note that the beverage dispensing rules can also be enforced partially, or completely, by a cloud based system, such as the beverage access controller 110 discussed below.

The data 108b sent (i.e., transmitted) by the beverage systems 102 at the given location can include reporting data and diagnostic data. The reporting data for each beverage system 102 at the given location can specify an amount of fluid that has been dispensed by the beverage system 102 at the given location and/or a type of fluid (e.g., brand of beer or wine) that has been dispensed by the beverage system 102 at the given location. The amount of fluid dispensed can be, for example, an absolute amount of fluid ever dispensed by the beverage system 102 at the given location, an amount of fluid dispensed since the last transmission of reporting data by the beverage system, or another absolute or relative measure of fluid dispensed (e.g., a measure of fluid/time).

The environment 100 includes a beverage access controller 110 and a data store 112. The beverage access controller 110 and the data store 112 can each be implemented as elements in a cloud computing environment (or as dedicated computing devices, such as dedicated servers, which are co-located with the beverage system or located at a remote location). The beverage access controller 110 is a data processing apparatus (e.g., a server or another cloud computing apparatus) that interacts with the client devices and the control terminals (e.g., control terminal 105) that are located at merchant locations (e.g., bars, restaurants, sporting events, festivals, etc.) of the beverage systems 102 at the given location. In some implementations, the beverage access controller 110 also interacts with the beverage systems 102 at the given location to control beverage dispensing according to dispensing rules. For example, the beverage access controller 110 can receive a request to configure the beverage systems 102 at the given location according to the dispensing rules for the location at which the beverage systems 102 at the given location are installed. In response to the request, the beverage access controller 110 can select data with which the beverage systems are configured and provide the selected data to the beverage systems 102 at the given location, either directly, or by way of the control terminal 105 at the given location. The beverage access controller 110 can select the data with which the beverage systems 102 at the given location can be configured, for example, from data store 112.

The data store 112 is a data storage apparatus storing data with which the control of beverage dispensing is performed. In some implementations, the data store 112 includes data that is used to configure the beverage systems 102 at the given location. In some implementations, the data store includes data that enables the beverage access controller 110 to manage beverage dispensing. The data store 112 can also store data that is reported by (i.e., received from) the beverage systems 102 at the given location and/or the control terminal 105. The data reported by the beverage systems 102 at the given location and/or control terminal 105 at the given location can include, for example, reporting data and/or diagnostic data.

In some implementations, the data store 112 includes an index of beverage system identifiers representing the beverage systems 102 at the given location, locations at which beverage systems are installed (or will be installed), and dispensing rules for the location. In these implementations, when a request for configuration data are received from a beverage system 102 that is installed at a particular location, the configuration data that is associated with that particular location can be selected from the index and provided to the beverage system 102 for which the configuration data was requested. Data that is indexed according to (e.g., stored at a memory location assigned to) a particular beverage system, a particular location, or any other reference data is referred to as being associated with the particular beverage system, particular location, or reference data.

In some implementations, the data that are selected from the data store 112 can be selected based on a state, county, or other location at which the beverage systems 102 at the given location are installed. In some implementations, each location (e.g., merchant), can specify their own set of dispensing rules, e.g., based on operating hours, to create a custom set of dispensing rules. In this situation, when a new beverage access controller is installed (or being re-configured), the custom set of dispensing rules that are stored in the data store 112 can be retrieved by the beverage access controller 110 and transmitted to the beverage access controller.

The configuration data can include data specifying one or more types of data upon which activation of the beverage system 102 at the given location is conditioned (i.e., data that must be received for the beverage system 102 at the given location to be activated for beverage dispensing). In some implementations, the configuration data specify that following an approval request for the user to dispense a beverage from the beverage system 102 at the given location, and prior to activating the beverage system, a user meet minimum requirements. In some implementations, the minimum requirements are minimum age requirements for drinking alcoholic beverages. Determining that the user meets minimum age requirements can be done at a given location, for example by a bartender, host, or ID card scanner, confirming the age of the user.

In some implementations, the configuration data specify that a client identifier must correspond to the user for the beverage system 102 at the given location to be activated. Determining that the client identifier corresponds to the user can be performed, for example, with a biometric confirmation and/or digital confirmation, as described in more detail with reference to FIG. 4.

In some implementations, the configuration data also specifies that the command required to open the valve of the beverage system must be received during a valid period (i.e., a period during which opening the valve of the beverage system is allowed). In these implementations, opening the valve of the beverage system is conditioned based on the valid period.

For example, assume that beverage dispensing is restricted to (i.e., allowed during) the first three quarters of a professional football game. In this example, the command to open the valve of the beverage system is required to be received during the first three quarters of the football game in order to activate beverage system 102 at the given location. Commands transmitted outside of this valid period can be considered invalid, and the valve of the beverage system is not opened.

In another example, assume that beverage dispensing for a particular restaurant or bar is only allowed from 12:30 pm-11:00 pm (e.g., the operating hours of the restaurant or bar). In this example, the valve of the beverage system configuration data that is provided to the beverage system 102 can specify that the valid period for the restaurant or bar is the period of time from 12:30 pm-11:00 pm, such that activation data must be received by the beverage system 102 and/or the control terminal during the hours of (or within a specified amount of time of) 12:30 pm-11:00 pm in order for the beverage system 102 at the given location to be activated. Thus, the configuration data can operate to restrict beverage dispensing to the hours 12:30 pm-11:00 pm by considering activation data that are received outside of the valid period as invalid activation data.

The data store 112 can also store reporting data and/or diagnostic data for the beverage system 102 at the given location. Each beverage system 102 at the given location can transmit reporting data and/or diagnostic data to the beverage access controller 110 for storage in the data store 112. The data from each beverage system 102 at the given location can be transmitted based on a reporting schedule or in response to specified events. For example, a beverage system 102 at the given location can be configured to transmit reporting data and/or diagnostic data to the data store 112 (and/or a client device 104) continuously, with a specified frequency (e.g., once every 30 minutes), or after a specified amount of fluid has been dispensed (e.g., 100 ounces). Similarly, the beverage system 102 at the given location can transmit reporting data and/or diagnostic data in response to a request for the data. For example, a request for the data can be received from a client device 104 of a merchant or another data processing apparatus. In response to receiving the request, the beverage system 102 at the given location can transmit the data 108 to the client device 104, the beverage access controller 110, and/or the data store 112.

The beverage system 102 at the given location can also be configured to transmit reporting data and/or diagnostic data in response to detection of a specified system condition. For example, the beverage system 102 can be configured to transmit (e.g., using the beverage access controller 109) reporting and/or diagnostic data in response to determining that the beverage system 102 at the given location has less than a threshold amount of free memory, that a temperature of the fluid being dispensed by the beverage system 102 is outside of a specified temperature range, that a pressure of the fluid at the beverage system is outside of a specified acceptable pressure range, that a valve or a flow meter is malfunctioning, that a beverage container (e.g., a keg) is empty or near empty (i.e., contains less than a specified amount of fluid), or that other system conditions exist. When the beverage system 102 transmits data in response to detection of a system condition, the beverage system 102 can also transmit the data and/or an alert message (e.g., to a client device 104) using e-mail, short message service (SMS), or another form of data communication.

The beverage access controller 110 manages access to the beverage systems 102 at the given location by users. For example, the beverage access controller 110 can require that a user be approved to dispense beverages prior to activating the beverage systems 102 at the given location. As described in more detail below, the approval process can begin with the user submitting an approval request to the beverage access controller 110 (e.g., through an application installed on their mobile device). Upon receipt of the approval request, the beverage access controller 110 can transmit an authorization request to the control terminal 105 located at the merchant location. The merchant can respond to the authorization request (e.g., through the control terminal 105) authorizing the user after confirming that the user meets the minimum requirements for dispensing beverages (e.g., is at least the minimum age to consume alcohol). When the beverage access controller 110 receives the authorization from the control terminal 105, the beverage access controller can validate (e.g., grant) the approval request, thereby authorizing the user to dispense beverages using the beverage systems 102 installed at the merchant's location. In some implementations, the beverage systems 102 will only be activated after the user subsequently initiates a pour request at one of the beverage systems 102. The pour request can be initiated, for example, by way of an RFID reader, QR code, NFC, biometric scanner, or another technology that enables one the beverage systems 102 to detect the presence of the user at that beverage system 102. While the user is authorized, the beverage system 102 will be activated, thereby enabling the user to pour beverages using the beverage system. Activation of the beverage systems 102 is discussed in more detail throughout this document.

Figure 2:
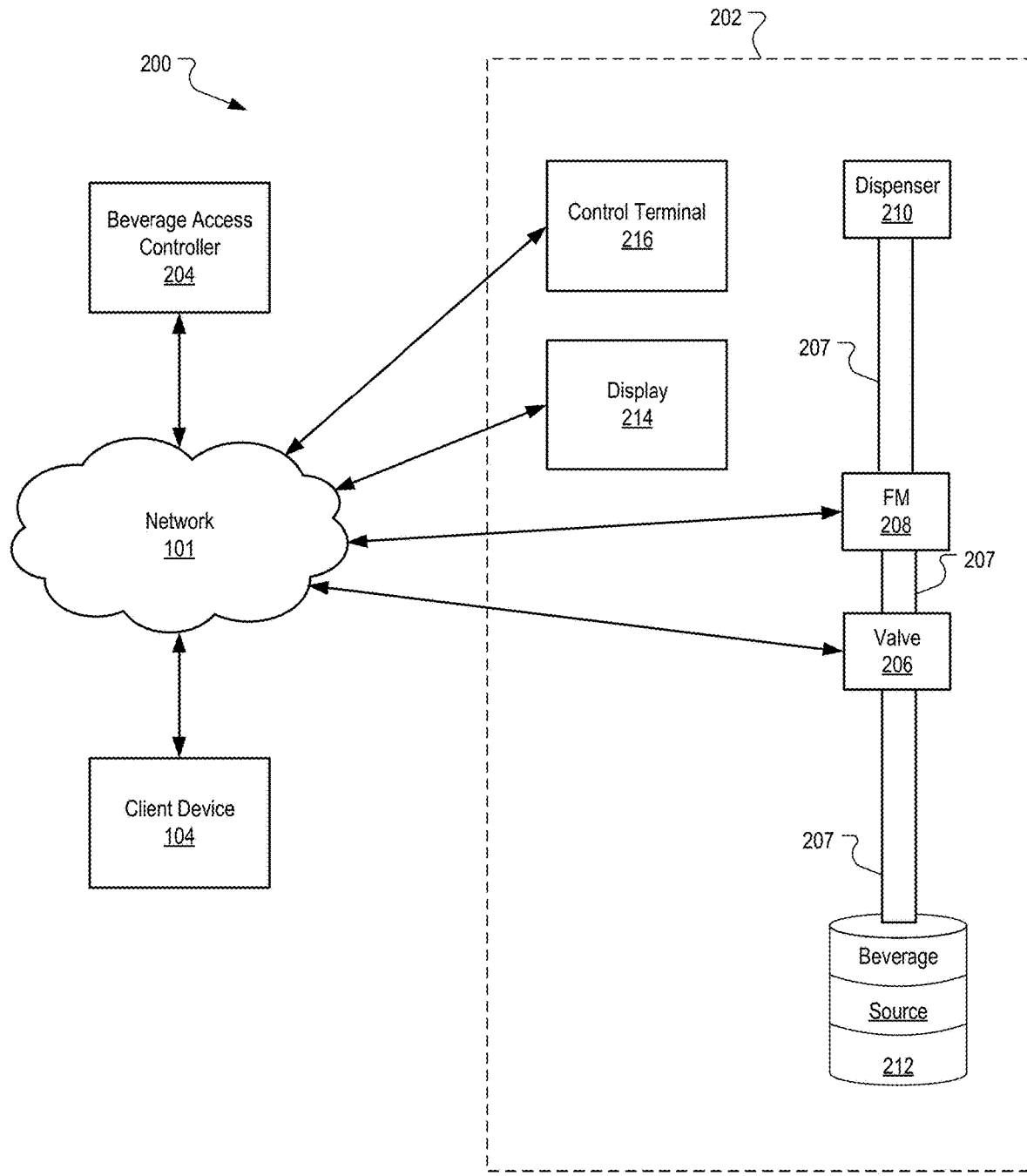
FIG. 2 is a block diagram of an example dispensing system.

FIG. 2 is a block diagram of an example dispensing system 200. The example dispensing system 200 enables users and customers to dispense their own beer (or another beverage). While the system 200 is described with reference to self-service beer dispensing, the system 200 can also be used in other environments. For example, the system 200 can also be used to streamline activities of bartenders.

The system 200 has a beverage access controller 204 that includes one or more data processing apparatus (e.g., microprocessors or a controller in a cloud computing environment) and one or more memory devices. The data processing apparatus (e.g., the microprocessors or controllers) can be co-located with the beverage system, and/or located in a remote location (e.g., a dedicated server or cloud computing environment). The beverage access controller 204 is configured to interact with a client device 104 of a user (e.g., is a cloud processor over a network 101) and a beverage system 202 at a given location, as well as the elements within the beverage system 202 at the given location, as described below.

The beverage access controller 204 is configured to interact with a client device 104, e.g., over a network 101. The data processing apparatus of the beverage access controller 204 transmits data to and receives data from the client device 104 over the network 101. In some implementations, the beverage access controller 204 receives approval request from the client device 104 to dispense beverages from the beverage system 202 at the given location. For example, a user can interact with an application installed on their mobile device to request approval to pour beverages at the given location.

In some implementations, the application can present a map identifying locations that offer self-serve beverage dispensing that is managed by the beverage access controller 204. For example, the client device 104 can receive from the beverage access controller 204 location information of beverages and/or merchants that are available near the user. In some situations, the client device 104 can receive a list and/or map location of beverages and/or merchants on a map displayed on the client device. This can be done, for example, using an application on the client device 104 that tracks beverages and merchants, and displays information including but not limited to beverage availabilities, beverage prices, and merchant locations. The user can interact with the information presented in the application, which can trigger submission of the approval request to the beverage access controller 204.

In some implementations, the data processing apparatus of the beverage access controller 204 can receive user preferences of the user, and transmit digital content over the network 101 to the client device 104. The beverage access controller 204 can receive user preferences over the network 101 and also transmit digital content to the beverage system 202 at the given location (for example, to the display 214, as discussed in more detail below). User preferences, for example, can include a user's preferred type of beer, preferred breweries or source of beer, and preferred flavor notes of the beer.

In some situations, the beverage access controller 204 can also send a merchant digital content over the network 101. For example, the beverage access controller 204 can send the merchant beverage source information that presents one or more of the remaining amount of the beverage in the beverage source (for example, as reported to the beverage access controller 204 by the flow meter 208, as discussed in more detail below). For example, the beverage access controller 204 can transmit over the network 101 to the merchant using a client device 104 that there is no beverage (e.g., beer) left in the beverage source 212 (e.g., keg) or that the remaining amount of beverage is below a threshold amount.

The data processing apparatus of the beverage access controller 204 is configured to interact with a beverage system 202 at the given location. In some implementations, the beverage access controller 204 interacts with multiple beverage systems 202 at the given location. The beverage access controller 204 transmits to a control terminal 216 at the given location an authorization request that includes a client identifier corresponding to the approval request. For example, a client identifier can be as simple as a user's name or ID (e.g., driver's license), used to identify the user's identity against both the user and the approval request. In some implementations, the client identifier can include but is not limited to biometric confirmation (including but not limited to facial recognition, fingerprint scanner, and voice analyzer) and/or digital confirmation indicating that the user has met a digital challenge requirement (including but not limited to a QR code reader, RFID reader/writer, NFC, Bluetooth, magnetic card reader, smart card reader, bar code reader, pin pad entry, and another type of input/output interface that is configured to interact with other identification objects) (see FIG. 6). For example, after transmitting the approval request, the user can receive a unique QR code from a merchant control terminal 216, which the user can scan at the merchant location (e.g., QR code reader) to show the user corresponds to the approval request, instead of having to provide the user's name.

The authorization request transmitted by the beverage access controller 204 to the control terminal 216 at the given location (e.g., a computer at the bar) also requests confirmation that the user of the client device 104 is approved to use the beverage system 202 at the given location based on validation that the user of the client device meets minimum requirements for dispensing beverages provided by the beverage system. In some implementations, confirmation that the user of the client device 104 is approved to use the beverage system 202 at the given location occurs when a bartender check the user's ID to ensure the user meets minimum age requirements to drink alcohol.

In some implementations, confirmation that the user of the client device 104 is approved to use the beverage system 202 at the given location includes determining a current state of the user (e.g., whether the user is sober, intoxicated, or appears visibly intoxicated). In some situations, the user's current state is compared to a baseline state for the user (e.g., a sober user, or the user's sobriety when the user first entered the bar) to determine whether the user can utilize the beverage system. A state message can be provided to the control terminal when the current state of the user deviates from the baseline state by at least a specified amount. For example, assume that a wearable device is monitoring the user's heart rate, blood pressure, and/or sweat composition. In this example, if any or all of the monitored information deviates from a baseline state, the wearable and/or mobile device can transmit a state message to the control terminal, alerting the merchant of the state change. The merchant can then interact with the user to determine whether the user can continue to use the beverage system 202.

When the client identifier matches the user to the user's approval request, and the data processing apparatus of the beverage access controller 204 receives confirmation that the user of the client device 104 is approved to use the beverage system 202 at the given location, the data processing apparatus of the beverage access controller 204 can activate the beverage system for use by the user of the client device 104. In some situations, the activation can occur immediately, and in other situations the activation can be delayed, for example, until receipt of a pour request is received, as discussed in more detail below. The beverage access controller 204 activates the beverage system 202, for example, by transmitting to the beverage system 202 the command that is required to open the valve located between the beverage source 212 and the beverage dispenser 210 that controls beverage flow when the valve 206 is open. The valve 206 can be a part of the tap (see FIG. 6). The valve 206 controls flow of fluid from the beverage source 212 through a line 207 to the dispenser 210. The data processing apparatus of beverage access controller 204 controls the valve 206.

The beverage access controller 204 can specify dispensing rules for the beverage system 202 at the given location. For example, to open the valve 206 of the beverage system 202 located between the beverage source 212 (e.g., a keg) and the dispenser 210. The beverage access controller 204, can receive data from the elements of the beverage system 202. For example, beverage system 202 is specified to be activated to dispense beer from 12:30 pm-11:00 pm, the beverage access controller 204 can interact with the beverage system 202 to cause the valve 206 to open at 12:30 pm and close at 11:00 pm.

In some implementations, the beverage system 202 includes a microcontroller that opens the valve 206 by applying a control signal (e.g., a specified current and/or voltage) to the valve 206. The control signal that is applied to the valve 206 to open the valve will depend on the type of valve 206 that is used.

For example, when the valve 206 is a strike and hold valve, the valve 206 will require at least a minimum specified strike current be applied to open the valve 206 from the closed position. Once the strike and hold valve has been opened the control signal that is applied to the valve 206 can be reduced to a value that is greater than a minimum "hold current," where the "hold current" is a current having a lower magnitude than the minimum specified strike current used to open the valve 206.

As long as the control signal is maintained at a current magnitude that is greater than the minimum hold current, the valve will remain open. Once the control signal falls below the minimum hold current, the valve 206 will close. Using a lower current to keep the valve open (i.e., a lower current than that required to open the valve) results in less heat dissipation, which in turn, reduces the possibility that the temperature of the fluid flowing through the valve 206 will increase due to operation of the valve. Thus, the temperature of the fluid passing through the valve 206 can be maintained at a desired serving temperature, such that the taste of the beverage is not affected by heat dissipated by the valve 206. A strike and hold valve is described for purposes of example, but other types of valves can also be used. For example, a toggle valve that opens and closes in response to a rising edge of a toggle signal can be used. Each beverage system 202 at the given location can include more than one valve 206. Other solenoid valves can also be used. In some implementations, pin valves can also be used.

When it has been determined that the customer has finished dispensing beer, the valves 206 is closed. In some implementations, the beverage system and/or the beverage access controller 204 can determine that the customer has finished dispensing beer when no beer has been dispensed for at least a specified time. For example, if more than 2 seconds (or another specified time) has passed since the customer dispensed beer, the beverage access controller 204 can cause the valves 206 to close. The amount of time that has passed since the customer dispensed beer can be determined, for example, based on an amount of time since the beverage access controller 204 has received data from the flow meter 208 indicating that beer has been dispensed. In some implementations, the beverage system (e.g., a smart tap) can monitor use of the beverage system by the user and close the valve when the user is determined to have completed dispensing.

The valve 206 can also be closed in response to other conditions. For example, the valves 206 can be selectively closed in response to a determination that the beverage source 212 from which the beer is drawn is empty. Additionally, the valve 206 can be selectively closed in response to determining that the temperature of the beer is outside of an acceptable range (e.g., if the beer is too warm to serve). Further, the valve 206 can be closed in response to detection of a beverage system 202 malfunction that inhibits the control and monitoring of beer dispensing.

In some implementations, the beverage system 202 includes a flow meter 208 installed on the line 207 to measure the flow of fluid that is dispensed using the dispenser 210. The flow meter can be a part of the tap (see FIG. 6). Beverage access controller 204 can receive data from flow meter 208. As the fluid flows, the flow meter 208 measures the amount of fluid that is being dispensed by the dispenser 210, as described below. In turn, the flow meter 208 continuously or periodically provides flow data to the controller. The flow data are data that represents a measure (e.g., total volume, rate of dispensing, or another measure) of fluid that has passed through the flow meter 208. In some implementations, the flow meter 208 measures the amount of fluid that is dispensed using a dispenser 210, and report the amount to the beverage access controller 204. The flow meter can be any type of means of liquid measurement, such as a paddle wheel, turbine, and/or ultrasonic meter. The flow meter 208 can also measure flow rate as volume of liquid sent to dispenser 210 over time. For example, a merchant can take into consideration which beers are consumed at the highest rate and are thus popular when ordering inventory.

The dispenser 210 is a device that controls the flow of fluid out of the beverage system 202 at the given location. For example, the dispenser can be another valve 206, a beer tap (see FIG. 6), or another device that can be actuated to control the flow of fluid. When the valve 206 and the dispenser 210 are both opened, fluid flows from a beverage container 212 through a beverage line 207, the valve 206, the flow meter 208, and the dispenser. The benefit of having essentially two valves is that the merchant at the control terminal 216 can send a command to the beverage access controller 204 to command the valve 206 be opened (e.g., when a QR code, RFID card, or NFC communication is at the beverage system), and the user can open the second valve (e.g., by pulling the lever at the tap) when the user is ready to dispense. That way, the user does not have to immediately dispense when the command is sent by the control terminal, but can dispense on the user's own time and leisure.

In some implementations, the amount of beer that the user is allowed to dispense can be based on a dispense limit. The dispense limit is a volume of beer that the user can dispense before the user is required to request approval to dispense more beer (e.g., by speaking with a designated employee of the restaurant or bar). For example, prior to the customer dispensing any beer, the amount of beer that the customer is allowed to dispense can be equal to the check limit. Each time the customer dispenses beer, the amount of beer that the customer is allowed to dispense is decreased by the amount of beer dispensed by the customer. In some implementations, the dispense limit is a budget limit, where the budget limit is an amount of funds the user can go through before the user has to go to the merchant to request more funds. In another example, the dispense limit can be a specified amount, e.g., according to state or local safe dispensing regulations.

In some implementations, the beverage system 202 has a display 214. In some implementations, the controller 204 be coupled to the display 214. The display 214 can be, for example, a liquid crystal display (LCD). The display can be located, for example, near the dispenser 210 so that a user that opens the dispenser 210 can be presented with the data received by the beverage access controller 204. The display can also be located near the control terminal 216 so the merchant can check what beverages are in demand, which need to be refilled, and to track patrons' consumptions.

The display 214 is an optional element of the beverage system 202 at the given location, as the beverage system 202 at the given location can be implemented without the display 214. For example, reporting data and other information that would be presented using the display 214 and/or a client device 104. For example, a user's mobile phone can mimic the information displayed on the display 214.

In some implementations, the beverage access controller 204 can use the display 214 to present beverage source information. Beverage source information can include one or more of a remaining amount of beverage in the beverage source. For example, the display 214 (e.g., the display of the beverage system and/or the display of the client device) can present to the merchant the amount of beer left in the beverage container 212, so the user can decide (if there remains little beverage left) to decide which beer to drink based on availability of one beverage over another. In some implementations, the display 214 can present an amount of fluid that has been dispensed by the dispenser 210, a total cost for the dispensed fluid, messages to a user and/or merchant using the dispenser, and other information related to the fluid being dispensed (e.g., temperature of the fluid).

In some implementations, the display can also present an amount of fluid that a user is allowed to dispense before being re-authorized (e.g., if there is a drink limit or a cut-off limit to how much the user can pour). In another example, if the user activates the beverage system for 20 ounces of beer, the display 214 can present the user with a progress bar of how many of the 20 ounces have been dispensed. Further, the beverage access controller 204 can use the flow data to provide reporting data, for example to the user of the client device 104 or the merchant at the control terminal 216 (e.g., to alert the merchant to refill or reorder inventory).

In some implementations, the display 214 can present beverage source information that includes a description of the beverage. For example, the display 214 can present information about beer including but not limited to brewery information, flavor profiles, style, and costs. In some implementations, the display 214 can present user notes about the beverage submitted by one or more other users, for example, recommendations, suggestions, and past reviews about a beer in the beverage container 212.

The beverage access controller 204 can provide reporting data and/or diagnostic data to client devices, a beverage access controller, and/or data stores that are coupled to the network 101. Thus, beer dispensed by many different beverage systems 202 can be controlled and monitored from a central location, even when the beverage systems are installed at locations that are geographically far apart.

In addition to implementing systems that control and monitor self-service beer dispensing, beverage systems similar to those described above can also be used to implement a system that enables control and monitoring of beer that is dispensed by employees of a business or event location. In some implementations, beverage systems similar to those described above can be implemented in a system that controls and monitors beer that is dispensed at an event venue, such as a sports stadium or a concert venue, as described below.

Figure 3:
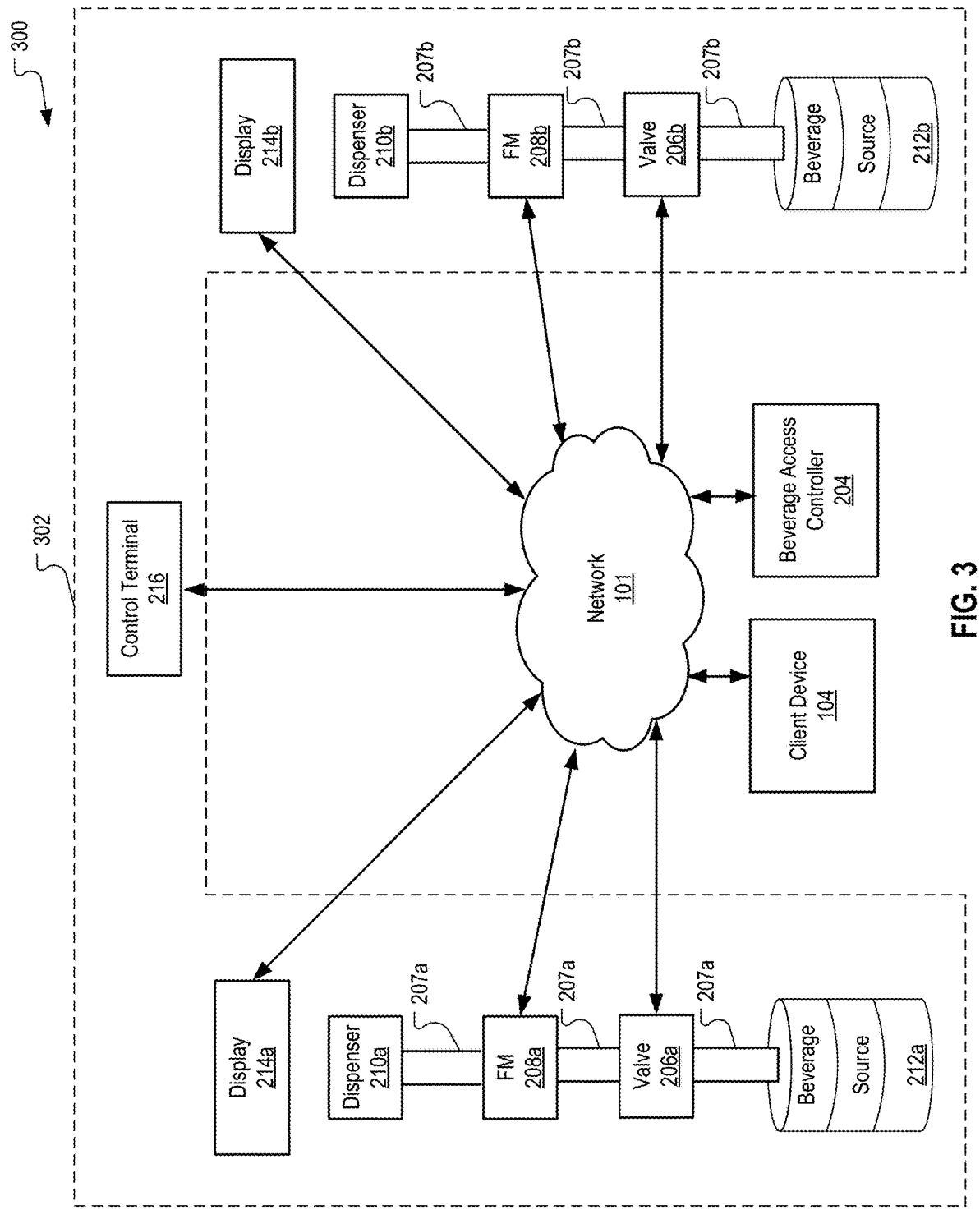
FIG. 3 is a block diagram of an example dispensing system.

FIG. 3 is a block diagram of an example beverage system 300. The example beverage system 300 is a beverage system with which users and customers can dispense their own beer (or another beverage). While the system 300 is described with reference to self-service beer dispensing, the system 300 can also be used in other environments (e.g., by a bartender behind a bar). Additionally, while the system 300 is described with two sets of elements, there can be additional sets of elements.

The system 300 is an example of a system that can control and monitor beverage dispensing (e.g., beer dispensing) from multiple different beverage sources 212a and 212b (e.g., kegs). The system 300 includes beverage system 302 at the given location having similar elements similar to those described above with reference to FIG. 2. Accordingly, in some implementations, the functions of the elements from FIG. 2 are similarly incorporated into the elements of FIG. 3.

The beverage system 302 has a beverage access controller 204 and multiple dispensers 210a and 210b. Each of the dispensers 210a and 210b has a valve 206a and 206b that controls flow of fluid through the line 207a and 207b to the dispenser 210a and 210b. Flow meters 208a and 208b are respectively installed on each of the lines 207a and 207b to measure the flow of fluid that is dispensed using the dispensers 210a and 210b. The beverage access controller 204 control the valves 206a and 206b and received data from flow meters 208a and 208b. Optionally, separate displays 214a and 214b correspond to valve 206a and 206b, flow meter 208a and 208b, dispenser 212a and 212b, and beverage source 212a and 212b, respectively. In some implementations, displays 214a and 214b can be one display, and not separate.

In some implementations, the data processing apparatus of the beverage access controller 204 can receive an indication that the client device is present at a particular beverage dispenser of the beverage dispenser. For example, the pour request is generated when sensors detect that the client device 104 (e.g., the user's smartphone or wearable device) is present at the first dispenser 210a, which is next to a second dispenser 210b. Detection can be done, for example, using proximity sensors, RFID sensors, biometric sensors, or other sensors to detect when the client device 104 is at the first dispenser 210a, which can then submit a pour request to the beverage access controller 204. In another example, the pour request is generated when the user expresses some indication that they want to pour, e.g., when the user presses a button (e.g., pressing a button on the display 214, or pressing a button located on the tap). The beverage access controller 204 can then transmit the command to open a valve 206a of the first dispenser 210a in response to receiving the pour request, which is an indication that the client device is present at the first dispenser 210a. The command to open the valve 206a can be transmitted to the valve 206a without affecting the state of the valve 206b of the second dispenser 210b. For example, the user can dispense German lager beer using dispenser 210a, as valve 206a has been opened in response to the request to pour German lager beer. However, sour beer from beverage source 212b cannot be dispensed from dispenser 212b because valve 206b has not been opened, as only German lager beer and not sour beer has been requested by the user.

The beverage system 302 can be located, for example, at concession stands in a sports stadium. The beverage access controller 204, can receive, over the network 101, configuration data that specifies dispensing rules for the stadium and/or the particular concession stand. The configuration data for the stadium can include for example, data specifying valid periods during which beer is allowed to be dispensed. In some implementations, the valid periods are periods during which events are being held at the stadium. In these implementations, the configuration data received by the beverage access controller 204 can specify a schedule of events.

The schedule of events can include, for each event, a start time and a stop time. The start time represents a start of the valid period for the event (i.e., the period during which beer is allowed to be dispensed). The start time can be, for example, the start time of the event, or a specified amount of time prior to (or after) the start of the event. While the start time specifies a period during which beer is allowed to be dispensed, the activation of the beverage system 302 can be conditioned on transmitting activation data from the beverage access controller. For example, the configuration data can specify that the beverage system 302 is only activated when activation data has been transmitted by the data processing apparatus of the beverage access controller 204 during the valid period. The configuration data can also specify, for example, that the activation data be transmitted during the valid period.

The stop time represents an end of the valid period for the event. When the stop time has occurred, the valve 206a and 206b are closed, such that beer can no longer be dispensed from the beverage system 302. The stop time can be, for example, the time at which the event is scheduled to end, a time prior to (or after) the time at which the event is scheduled to end, or a time at which a specified event occurs. For example, the stop time during a football game can be the time at which the third quarter ends (i.e., the time at which the time remaining in the third quarter reaches 0:00). At the expiration of the third quarter the beverage access controller 204 receives data specifying that the game has reached the end of the third quarter, and the time at which the data are received can be set as the stop time for the event. In turn, the beverage access controller 204 can interact with the valves 206a and 206b to place these valves in the closed position.

Figure 4:
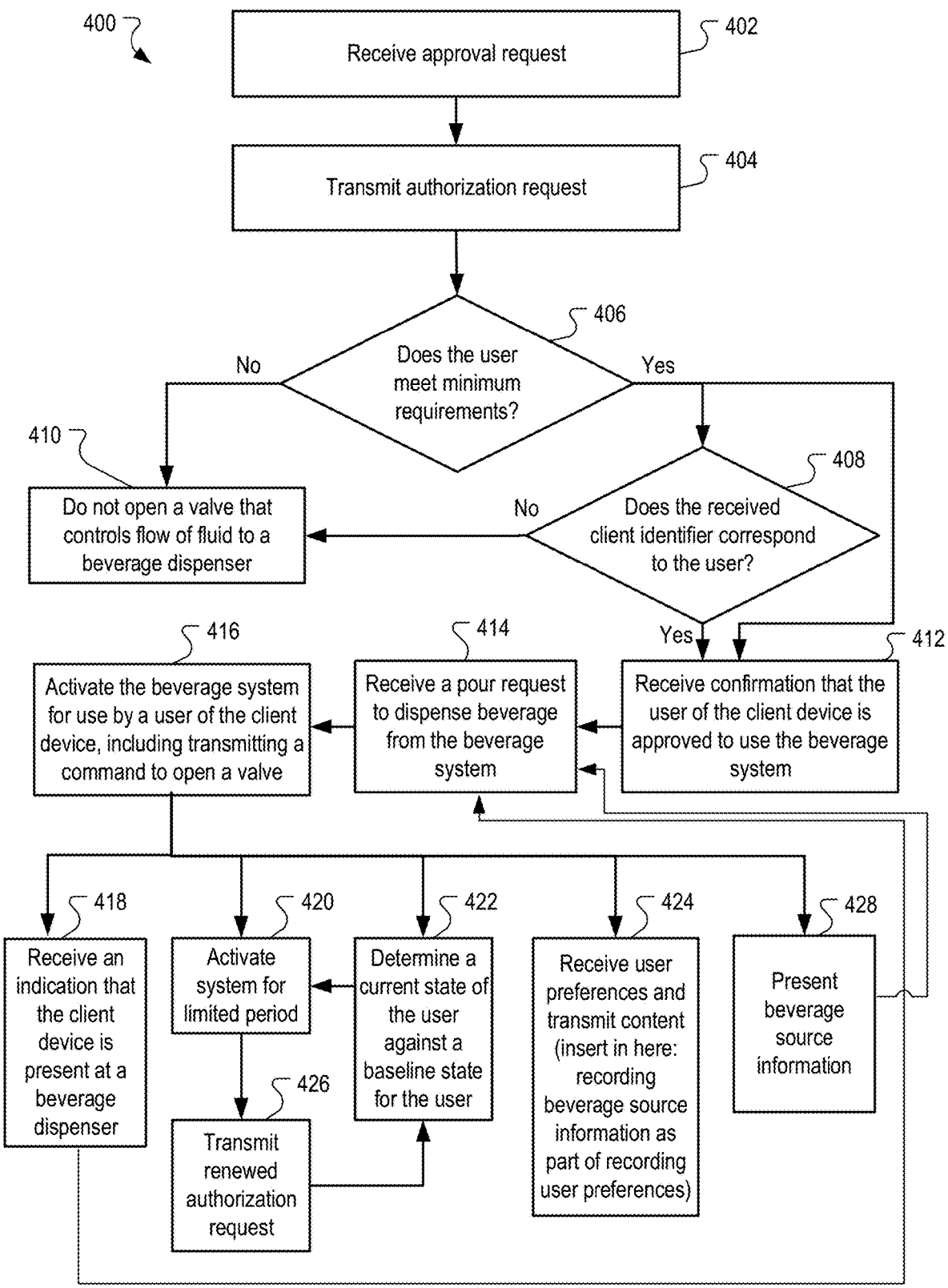
FIG. 4 is a flow chart of an example process for activating a dispensing system.

FIG. 4 is a flow chart of an example process 400 for activating a dispensing system. The process 400 can be implemented, for example, the beverage access controller 110 of FIG. 1. In some implementations, the beverage access controller 110 is a data processing apparatus that includes one or more processors that are configured to perform actions of the process 400. In some implementations, a computer readable medium can include instructions that when executed by a computer cause the computer to perform the actions of the process 400. The process 400 is described below with reference to controlling beer dispensing. The process 400 can also be used to control dispensing of other fluids.

A data processing apparatus receives an approval request from a client device (402). In some implementations, the approval request requests approval for a user to dispense a beverage from a beverage system at a given location. The approval request can be received from a client device, such as a mobile device of a user. The approval request can be transmitted over a wireless network, such as Wi-Fi or a cellular network. In some implementations, the request will be sent to a cloud and/or app server. For example, a user can go into a consumer mobile app or a website that can request approval from a bar to dispense and drink beer at the bar. The request can be for all the selections the bar offers, or for a particular beverage at the bar. The request can be for a specified amount of beer, or for a specified amount of funds to use at the bar. In some implementations, the client identifier can be biometric scan (e.g., fingerprint scanner, facial recognition). In some implementations, the client identifier can be digital (e.g., a unique passcode, pin code, username, user ID, user credentials associated with the user). In some implementations, a user can interact with an application installed on their mobile device to find a location of the beverage system on a map of the application. The approval request can be submitted through the user's interaction with the application on their mobile device.

An authorization request is transmitted to a control terminal of the given location (404). In some implementations, the authorization request includes a client identifier corresponding to the approval request. As described above, the client identifier corresponding to the approval request can be biometric and/or digital. In some implementations, the authorization request can be transmitted to a control terminal, for example, using a mobile or wireless network. The control terminal differs from the client device. For example, a data processing apparatus can transmit an authorization request to the control terminal, e.g., a computer at the bar, to allow a bartender (or other employee) to identify and authorize the user with a biometric confirmation that the client identifier corresponds to the approval request (e.g., fingerprint scanner, facial recognition). The bartender can also identify and authorize the user with digital confirmation as well (e.g., comparing user credentials accompanying the approval request against a database of user credentials).

The authorization request requests confirmation that a user of the client device is approved to use the beverage system at the given location based on validation that the user of the client device meets minimum requirements (406). In some implementations, the validation that the user of the client device meets minimum requirements can be validating the user meets minimum age requirements to drink alcoholic beverages (e.g., ensuring a client user is of age if the user is requesting to dispense beer in a jurisdiction where the minimum drinking age is 21). For example, a bartender at the bar can request to see the user's ID or drivers' license to validate a minimum drinking age.

In some implementations, validating that the user meets minimum requirements involves providing a state message to the control terminal when a current state of the user deviates from a baseline state by at least a specified amount. Determining a current state of the user can be, for example, a bartender seeing if the user is sober or appears visibly intoxicated. The current state of the user is compared to a baseline stare for the user. For example, the baseline could be a level of sobriety expected of most users, and/or the sobriety of the user when they first entered the bar. A state message is provided to the control terminal when the current state of the user deviates from the baseline state by at least a specified amount (e.g., the use is too intoxicated to serve). For example, if the bartender determines that the user has become too intoxicated, then the bartender can provide a state message to the control terminal that the user is too intoxicated and is thus cut off, and any further approval requests will be denied. Or, for example, the bartender can provide a message stating that the user can have just one more drink before being cut off and denying any further approval requests. In some implementations, the approval request is denied because of a non-receipt of a confirmation that the user meets minimum requirements, and thus a valve that controls flow of fluid to a beverage dispenser is not opened (410). However, if the user does meet minimum requirements, then the confirmation that the user meets minimum requirements is confirmed and the confirmation data is transmitted to the data processing apparatus that the user of the client device is approved to use the beverage system (412).

If the user of the client device does not meet minimum requirements for dispensing beverages provided by the beverage system (406), the control terminal does not provide the data processing apparatus confirmation data, and thus the beverage system does not receive the confirmation required to open a valve of the beverage system (410). For example, validation that the user of the client device meets minimum age requirements for dispensing beverages provided by the beverage system can be done by a bartender at the given location (e.g., a bar or brewery) checking the user's ID card or driver's license to validate the user of the client device is of age to drink alcohol. If the bartender at the given location check's the user's ID and sees the user does not meet minimum age requirements for consuming alcoholic beverages, then a confirmation is not sent to the data processing apparatus, and the valve is not opened (410). Alternatively, the bartender at the control terminal can deny the confirmation (e.g., by pressing a "not of age" or "deny" button at the control terminal), which can then inform the data processing apparatus that the user has been denied, and the valve is not opened (410).

In some implementations, if the client identifier received by the data processing apparatus does not correspond to the user of the client device (408), the system does not receive the confirmation that the user of the client device is approved to use the system, and the valve that controls flow of fluid to the beverage dispenser is not opened (410). For example, the valve does not open because the biometric confirmation failed (e.g., fingerprint scan of the user does not correspond to the fingerprint scan of the approval request), and/or the digital confirmation failed (e.g., the user credentials do not correspond to the user credentials included with the approval request).

If the user of the use device meets minimum age requirements for dispensing beverages provided by the beverage system (406), then the data processing apparatus can receive a confirmation that the user of the client device meets minimum age requirements (412). For example, a bartender at a control terminal can press or select a "confirmed" button that transmits the confirmation to the cloud when they check the user's drivers' license and see they are meet the minimum age requirement to drink alcohol.

In some implementations, the method can also require the client identifier received by the beverage system to correspond to the user of the client device (408) for the data processing apparatus to receive the confirmation that the user of the client device is approved to use the beverage system (412). For example, a biometric confirmation (e.g., fingerprint scan, facial recognition) and/or a digital confirmation indicating that the user has met a digital challenge requirement (e.g., the user's credentials included in the approval request correspond to the user's credentials stored in a database, or scanning a QR code).

If the client identifier is not confirmed to correspond to the user, then the valve that controls flow of fluid to the beverage dispenser is not opened as there is no receipt of confirmation data, and for example, the approval request is timed out (410).

Following receiving confirmation that the user of the client device is approved to use the beverage system (412), a pour request can be received from the beverage system indicating the user of the client device is ready to dispense a beverage from the beverage system (414). The pour request can include one or more of the biometric confirmation indicating that the user has provided biometric information that matches stored biometric information for the user or the digital confirmation indicating that the user has met a digital challenge requirement. Activating the beverage system can include activating the beverage system based on the one or more of the biometric confirmation or the digital confirmation included in the pour request. For example, the biometric confirmation can include one or more of a fingerprint scanner, a voice confirmation, and a facial recognition scanner. The digital confirmation can include requiring the user to enter a pin code or passcode, scan a QR code or barcode, detect and scan an RFID card, proximity sensor, or connect through a wireless network or Bluetooth.

The biometric confirmation and/or the digital confirmation can be performed by a smart tap identifier 676 or a camera 678 located at the tap (see FIG. 6) or a camera located on the client device. In some implementations, the biometric confirmation or digital confirmation would not need the client device to dispense a beverage from the beverage system. For example, the user can leave the client device at a table and perform a biometric fingerprint scan confirmation. In some implementations, the client device can be a wearable device that is connected to the client device, for example, a smart watch that can be detected by the beverage system and used to identify the user as an approved user of the beverage system, for example, as discussed with reference to FIG. 6. The smart tap identifier 676 can detect the wearable device (e.g., using a proximity sensor or Bluetooth to detect when the wearable device is near the smart tap identifier 676, whether or not the client device is near the wearable device or the smart tap identifier 676. In scenarios where a user left their client device out and someone else requested activation of the beverage system, performing biometric and/or digital confirmation has the advantage of ensuring whether or not the user connected to the client device requested activation of the beverage system.

Subsequently, the data processing apparatus transmits, a command that is required to open a valve of the beverage system located between a beverage source and a beverage dispenser that controls beverage flow when the valve is open (416).

In some implementations, the beverage system can receive an indication that the client device is present at a particular beverage dispenser of the beverage system (e.g., by way of a pour request). The data processing apparatus can transmit a command to the beverage system that opens a particular valve of the particular beverage dispenser in response to receiving the indication that the client device is present at the particular beverage dispenser. However, the transmitted command does not affect the state of other valves in the beverage system (418). For example, the user can approach two or more dispensers that dispense different beverages, such as a lager beer and a sour beer. The user may select on the client device that they want the lager beer, and the beverage system will open the particular valve that controls flow of the lager beer, without opening the valve that controls flow of the sour beer. In some implementations, each tap (e.g., the lager beer tap and the sour beer tap) can have their own smart tap identifier 666 (see FIG. 6).

In some implementations, the indication that the client device is present at a particular beverage dispenser of the beverage system (418) can be received prior to receiving a pour request to dispense beverage from the beverage system (414). For example, the user of the client device can browse a selection of beverages at the beverage dispensers prior to making a selection of a beverage to dispense form the beverage system. During this time, the proximity of the user can be detected by an NFC device, a Bluetooth device, a camera, or another device. In some implementations, the indication that the client device is present at a particular beverage dispenser of the beverage system (418) can be received as a part of the pour request to dispense beverage from the beverage system (414). For example, the user of the client device can select the beverage to dispense from the beverage system, which can be an indication that the user is at the beverage dispenser and the trigger of a pour request.

In some implementations, activating the beverage system can include activating the beverage system for a limited period that ends when a specified amount of beverage has been dispensed (420). For example, the user of the client device can approach one beverage dispenser and the beverage system will open the valve for that particular beverage dispenser, so after the user self-pours 60 ounces beer for a pitcher, the beverage system will close the valve to prevent further self-pouring by the user. In another example, a controller instructed by a bartender at a control terminal may limit how many ounces a user may pour, or cut the user off after a certain number of ounces if the bartender decides the user needs to be cut off, e.g., due to the user's intoxication levels following a sobriety check. In another example, the dispense limit can be a specified amount, e.g., according to state or local safe dispensing regulations.

In some implementations, the process 400 can include determining a current state of the user, comparing the current state of the user to a baseline state for the user, and providing a state message to the control terminal when the current state of the user deviates from the baseline state by at least a specified amount (422). In some implementations, a deviation from the baseline state can be measured using deviations in biometric data (e.g., changes in sweat, heartrate, pulse, blood alcohol content). In some implementations, the user's wearable device (e.g., heart monitor or electrical sensor on a smart watch) can detect a deviation from the user's baseline level (such as maintained increased heart rate of over 80 beats per minute, or increased electrical conductivity due to increased sweat, or other sweat analysis) that is beyond at least a specified amount. In these situations, the wearable device (or another device) can transmit the state message to the control terminal alerting the merchant as to the changed state of the user.

In some implementations, the deviated specified amount can be also determined if the user begins to slur speech, spill drinks, appear visibly intoxicated, or display any other sign that indicates the deviation from the baseline state and into an unsafe threshold level of intoxication. For example, the bartender can determine the current state of a user against the baseline state for the user by determining an increase in the user's intoxication or sobriety level from the time when the user first entered the bar to the time after the user has already consumed several beers. If the bartender then decides the user needs to be cut off or decrease the user's further self-pours because the state of the user has deviated beyond a specified amount, the bartender can provide the state message to the control terminal that can command the valve of the beverage system to not open for the user, or to command the valve to not open after a the user pours a specified limited number of ounces to promote responsible self-pouring and drinking. In some implementations, the baseline state and current state can be determined and compared biometrically by one or more sensors. For example, the baseline state of the user and the current state of the user can be determined by measuring the user's heartrate, temperature, and/or sweat. In some implementations, the baseline state and current state can be determined and compared digitally.

In some implementations, if the specified amount of beverage to be dispensed is above a predetermined threshold amount, more than one user can be required to request activation of the beverage system. For example, a request to self-pour 60 ounces of beer (e.g., enough to fill a pitcher) may require more than one user request activation of the beverage system at the given location, if the given location limits the amount of beverage dispensed during the self-pour.

In some implementations, the process 400 can further include transmitting to the control terminal and the client device a message that the limited period ended when the specified amount of beverage has been dispensed, and transmitting to the control terminal a renewed authorization request (426). For example, when the user reaches a dispense limit (e.g., after the beverage system has been activated for a limited period of time that ended when the specified amount of beverage has been dispensed (420)), the process 400 can transmit a renewed authorization request (426). The renewed authorization request can include determining the current state user of the client device against a baseline state of the user of the client device (422) before permitting the user of the client device from activating the beverage system for use by the user of the client device (416). For example, by increasing the limited period of time that will end when the newly specified amount of beverage has been dispensed (e.g., by increasing the user of the client device's dispense limit).

In some implementations, the process 400 can include receiving, by the data processing apparatus, user preferences of the user and transmitting, by the data processing apparatus, digital content selected using the user preferences to at least one of the client device or the beverage system (424). For example, the user can add the user's preferences (e.g., favorite types of beer, favorite bars, favorite breweries, user reviews) to a database connected to the client device and/or the beverage system. Digital content including but not limited to amount of beverage in the beverage source, description of the beverage, price of the beverage, style of the beverage, beverage temperature, user notes about the beverages submitted by the user and other users, beverage suggestions, description of the beverage, description about the brewery associated with the beverage, amount of beverage remaining in the beverage source, notifications that a bar nearby has a user favorite beer, advertisements, promotional offers, beverage source information (e.g., beer type, flavors, ABV, brewery information), dispense status, dispense history, and integrations with other applications and social media can be sent to one or more of the client device 104, an audio player 654 on the smart tap 600, and a smart tap visual display 656 on the smart tap 600 (see FIG. 6). In some implementations, the beverage system collects data regarding users' pours, including but not limited to who poured, what was poured, where the pour occurred, and how much was poured in order to provide digital content tailored to the user and the user's preferences. In some implementations, receiving the user preferences includes receiving crowdsourced user preferences. For example, if a beer is particularly popular with the community, then suggesting a beer can be based on an individual user's preferences as well as the crowdsourced community's preferences.

In some implementations, the method includes presenting beverage source information (428). The beverage source information can specify one or more of a remaining amount of beverage in the beverage source (e.g., that the keg of beer is half empty), a description of the beverage (e.g., the beer in the keg is a German lager or a sour beer), or user notes about the beverage submitted by one or more other users (e.g., users suggest this beer is hoppy, the beer has a 4 out of 5 star rating).

In some implementations, the method includes presenting beverage source information (428) prior to receiving a pour request to dispense beverage from the beverage system (414). This allows, for example, the user of the client device who wants to drink beer to preview the beverages and their corresponding information such as user reviews, types of beer, flavor notes, etc. to help the user select the beer beverage they would like to drink. In some embodiments, the beverage source information can be displayed on the display of the beverage system and/or presented to the user using an application on the user's mobile device.

Figure 5:
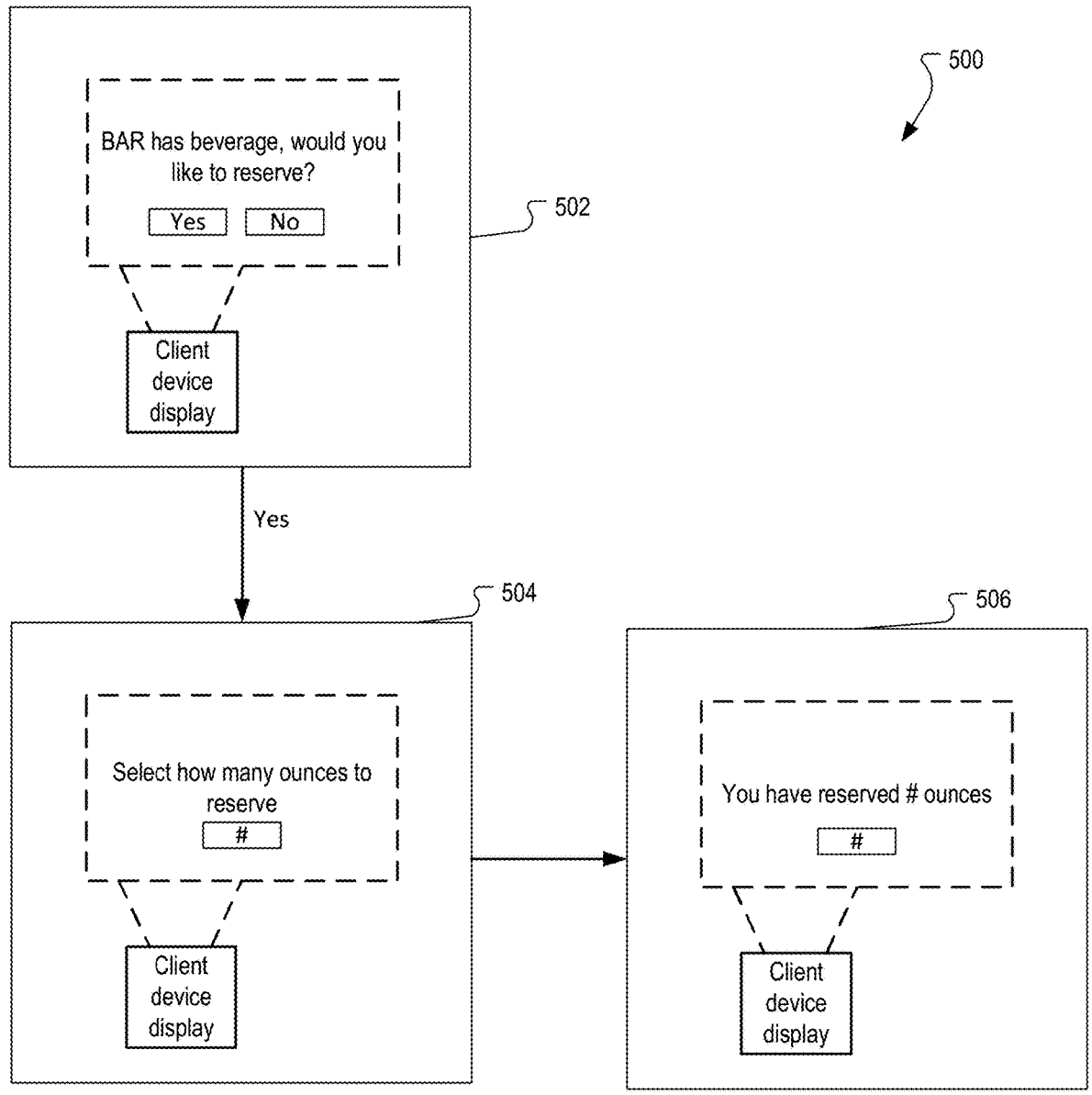
FIG. 5 is an example display of a beverage reservation method.

FIG. 5 is an example display of a beverage reservation method 500. The method can include receiving beverage source information from the given location, which can include beverage source information specifying a type of beverage being supplied by the beverage source. For example, the beverage source information can specify that the beverage is a sour beer or a German lager beer.

An availability notification for the type of beverage at the given location can be transmitted to the client device 104 (502). For example, the user can check on the client device 104 to see what beers are available at a certain bar, and the user can set a notification to notify the user if a certain beer becomes available within a certain area.

A client device can request to reserve a specified amount of the type of beverage for the user at the given location (504). For example, the user can see that a bar has a certain type of beer that the user enjoys, and the user can request the bar to reserve a pint of that beer.

A reservation message can be transmitted to the control terminal that reserves the specified amount of the beverage at the given location, and a notification of the reserve confirmation can be transmitted to the client device (506). For example, the user can see on the client device 104 that the selected number of ounces of beer that the user requested to reserve has been reserved. When the user has arrived at the given location the client device, the user can access their reserved beer (or other beverage) in a manner similar to that discussed above.

Figure 6:
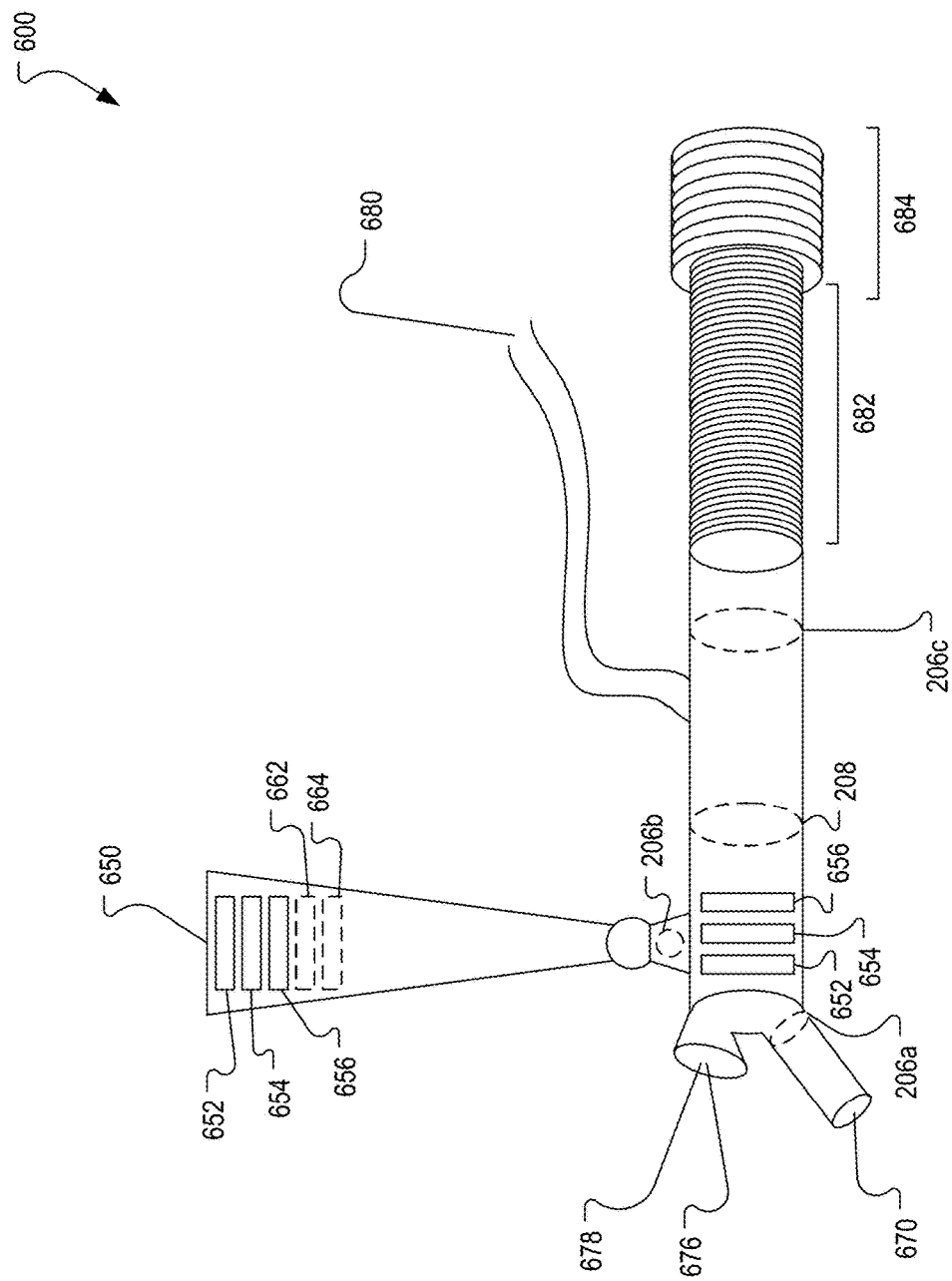
FIG. 6 is an example of a smart tap.

FIG. 6 is an example of a smart tap. The smart tap includes a handle 650, a flow meter 208, one or more valves 206a-c, a network communication device 662, a faucet 670, and the smart tap identifier 676 that uniquely identifies the smart tap 600. The handle 650 can include an internal power source 664 (e.g., a battery which can independently provide power or be supplied power via a cable 680) that powers the smart tap 600. The internal power source 664 can allow the smart tap 600 to be active when there is no hardwired power source available, for example, in music festivals when the smart tap 600 is not near a power source or generator. The smart tap identifier 676 can be specified in one or more of an RFID tag, a QR code, a barcode, or a Bluetooth transmitter. The smart tap 600 can include a camera 678 to perform the biometric confirmation or digital confirmation. For example, the user can scan a QR code on the smart tap identifier 676 to find out information about the beverage source information. The smart tap 600 can include a universal standard thread 682 that connects with a shank 684, allowing the smart tap 600 to fit onto most existing bar taps. The smart tap 600 can further include one or more of a light source 652, an audio player 654, or a visual display 656.

For example, a light source 652 that is green can indicate a beverage source that is still available, while a light source 652 that is red can indicate that the beverage source is depleted. For example, the light source can act as a progress bar light source where the light source lights up according to the user's preselected pour, or the light source fades as the user approaches the end of the pour. The light source 652 can also indicate whether the tap is on or off, or open or closed. For example, if a location does not serve beer past a certain time, then the light source 652 can turn from green to red to indicate the smart tap 600 cannot or will not serve beer.

In some implementations, the smart tap includes multiple valves 206a-c, for example, pin valves and/or solenoid valves. For example, the valve 206b can be a pin valve that is actuated (e.g., opens or closes) by the pulling of the lever handle 650. In another example, the valves 206a can be located near the faucet 670 and/or the valve 206c can be solenoid valves that are actuated (e.g., opens or closes) by an electric current that regulates a mechanism that controls the flow of beverage (e.g., beer).

The audio player 654 can play a chime, alert, or tone indicating that the user's pour has finished, or ask if the user would like to pour another pour.

The visual display 656 can display one or more of beverage source information, pour status information, and user reviews. The information presented by the visual display 656 can also be displayed on the client device 104.

The network communication device 662 can be powered by one or more of the battery 664 and cable 680 (housing a power supply).

The smart tap identifier 676 can detect a user's wearable device, e.g., using a proximity sensor or Bluetooth to detect when the wearable device is near the smart tap identifier 676, whether or not the client device 104 is near the wearable device or the smart tap identifier 676. In scenarios where a user left their client device out and someone else requested activation of the beverage system, performing biometric and/or digital confirmation has the advantage of ensuring whether or not the user connected to the client device requested activation of the beverage system.

In some implementations, the user's wearable device can detect the smart tap identifier 676, e.g., using a proximity sensor or Bluetooth to detect when the wearable device is near the smart tap identifier 676, and/or whether or not the client device 104 is near the wearable device or the smart tap identifier 676. The user's wearable device can communicate directly with the smart tap identifier 676 to perform the biometric and/or digital confirmation to ensure whether or not the user connected to the client device requested activation of the beverage system. In some implementations, the user's wearable device can detect the smart tap identifier 676 and communicate with the smart tap identifier 676 via the network and the beverage access controller.

There are many different ways in which various devices can interact to authorize a user to pour (e.g., based a pour request). For example, when a client device (e.g., mobile device and/or a wearable device) is in proximity with the smart tap, the client device detect the smart tap (e.g., wirelessly), and present information about the beverage that is dispensed by the smart tap (e.g., a type of beer). The user can then interact with the client device (e.g., by tapping a "request to pour" user interface element), which can generate a pour request. This pour request could be sent, by the client device, directly to the beverage access controller, or could be sent to the smart tap, which could then contact the beverage access controller. In any event, the pour request can then be handled by the beverage access controller as detailed throughout this document.

The cable 680 can connect the smart tap 600 to one or more data processing apparatuses, one or more memory devices, one or more data stores 112. The cable 680 can transmit data (e.g., digital content). The cable 680 can also house network communications wiring (e.g., Ethernet cables).

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data to a client device. Data generated at the client device can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A smart beverage tap, comprising:
   a shank end configured to connect to a shank of a beverage source;
   a faucet configured to dispense a beverage received from the beverage source through the shank;
   a tap identifier configured to (i) uniquely electronically identify the smart beverage tap and (ii) be electronically detected by a user device that is in proximity to the smart beverage tap;
   a communication device located between the shank end and the faucet, wherein the communication device is configured to receive activation data that activate one or more valves for actuation; and
   a light source configured to change illumination, wherein the light source is configured to illuminate at a beginning of a pour session of a user and change illumination as the pour session of the user progresses.

2. The smart beverage tap of claim 1, further comprising:
   a flow meter located between the shank end and the faucet, and configured to measure a flow of the beverage dispensed by the smart beverage tap;
   one or more valves located between the shank end and the faucet and configured to control a flow of the beverage from the shank end to the faucet; and at least one battery located between the shank end and the faucet, wherein the at least one battery is configured to power the communications device, the flow meter, and the one or more valves.

3. The smart beverage tap of claim 2, further comprising: a camera configured to perform biometric confirmation of a user proximate to the smart beverage tap.

4. The smart beverage tap of claim 3, further comprising: a visual display configured to display one or more of beverage source information, pour status information, or user reviews.

5. The smart beverage tap of claim 4, a handle configured to actuate at least one of the one or more valves, wherein the visual display is located in the handle.

6. The smart beverage tap of claim 5, wherein the tap identifier comprises one or more of a radio frequency identifier, quick-response code, barcode, or wireless transmitter.

7. The smart beverage tap of claim 6, wherein the tap identifier is configured to cause presentation of information at a user device in response to the user device detecting the tap identifier.

8. The smart beverage tap of claim 1, wherein the light source is configured to change colors as an indication of whether the tap is on, off, open, or closed.

9. The smart beverage tap of claim 1, wherein the light source is configured to convey whether the beverage source is depleted of the beverage.

10. The smart beverage tap of claim 1, wherein the light source is configured to fade as an end of the pour approaches.

11. The smart beverage tap of claim 1, wherein the light source is located in a handle.

12. The smart beverage tap of claim 1, wherein the light source is configured to change colors at a certain time to indicate that the smart beverage tap cannot serve the beverage.

13. The smart beverage tap of claim 1, wherein the shank end is threaded to interface with a threaded shank.

14. The smart beverage tap of claim 1, wherein the tap identifier is configured to cause presentation of a pour request user interface element at the user device that detects the tap identifier, wherein the pour request user interface element is configured to generate a pour request that requests activation of the smart beverage tap in response to user interaction with the pour request user interface element.

15. The smart beverage tap of claim 14, wherein the communication device is configured to receive the activation data that activate at least one of the one or more valves for actuation in response to generation of the pour request by the user device.

16. The smart beverage tap of claim 15, further comprising a camera oriented in a direction of the faucet and configured to perform biometric conformation of a user of the user device prior to activating the one or more valves for actuation.

17. The smart beverage tap of claim 16, wherein the communication interface is configured to communicate directly with the user device.

18. The smart beverage tap of claim 17, wherein the communication interface is configured to:
communicate with a cloud computing environment; and
request confirmation that the user of the user device that generated the pour request is authorized to dispense the beverage.

19. The smart beverage tap of claim 18, further comprising a biometric sensor configured to confirm that a person in proximity to the smart beverage tap is the user that is authorized to dispense the beverage.

* * * * *